Aug. 29, 1961 A. HUET 2,998,228
SURFACE HEAT EXCHANGERS
Filed Nov. 12, 1957 2 Sheets-Sheet 1

INVENTOR.
ANDRE HUET
BY 
ATTORNEY

INVENTOR.
ANDRE HUET

ATTORNEY

United States Patent Office 2,998,228
Patented Aug. 29, 1961

2,998,228
SURFACE HEAT EXCHANGERS
André Huet, 48 Ave. du President Wilson,
Paris XVI, France
Filed Nov. 12, 1957, Ser. No. 695,978
Claims priority, application France Nov. 23, 1956
6 Claims. (Cl. 257—262.18)

In tubular heat exchangers or absorbers, tubes traversed by or immersed in liquids that absorb or exchange their heat generally present heat exchange areas which are constant per unit length. However, heat exchange or absorption conditions obtaining at the input and output of the tubes respectively generally differ, would it only be for the fact that a circulating fluid gathers heat as it flows along the tube and, in so doing, alters the temperature conditions throughout the length of the tube.

The present invention concerns a tubular heat exchanger within which it is contrived to obtain heat exchange or heat absorption conditions that remain as constant as possible throughout the length of the tube, from one end to the other, or, more generally, to satisfy any predetermined law of heat exchange along the tube.

To attain that end, the claimant has already suggested the utilization of tubes presenting a variable heat exchange area per unit length so that temperature changes are allowed for and heat absorption, for instance, is maintained as far as is permissible, constant over the length of the tube. On the other hand, it is known that heat exchange rates between fluids can be modified by altering fluid flow conditions, for instance by varying the direction of fluid flow, pressure or velocity. To attain that end, it has already been proposed that deflecting surfaces be used, such surfaces being hereafter termed "heaters," because they are responsible for beat effects in the fluid flow.

The present invention is more particularly concerned with the development of tubular heat exchangers where constancy of heat absorption rate at the ends of the tubes or, alternatively, the establishment of a predetermined law of heat exchange along the tube, are assured through the provision between the exchanger's tubes or within the tubes themselves, of deflecting surfaces featuring corrugations of varying size which produce in at least one of the fluids with a heat exchange or heat absorption function beat effects permitting an adjustment of heat exchange or of heat absorption along the different parts of the exchanger system. Beating can be generated between the deflector surface and either the outer surface of the exchanger's tubes or the surface of fins provided on the tube itself or another tube.

According to the invention, beater devices can consist of semi-rigid metal strips with corrugated surface, such sheets being fitted between the tubes or supported by the tubes or welded to the tubes.

The variable action of the "beaters" can be derived not only from their relative position with respect to the tube, but also from the presence of corrugations of different amplitude and/or pitch. Such corrugations can also be distributed in symmetrical or asymmetrical manner.

To secure a predetermined law of heat exchange throughout the heat exchanger system, it is possible, according to the invention, to sectionalize a heat exchanger's tube over its whole length between input and output and to fit on the respective tube sections a tube bearing a constant relation of exchange area per unit length which would differ for each tube section. An alternative means consists in using constant or variable deflector areas for certain sections. Such constant or variable areas could vary in size from one tube section to another.

By arranging these sections in suitable sequence, it would be possible to secure any predetermined law of heat exchange throughout the exchanger system or, should that law become modified, to vary the relative position of the tube sections to satisfy the new law.

The merit of this arrangement is that, in addition, it is easier to construct tube sections featuring exchange areas that are constant per unit length, with the possibility for deflector areas of variable or constant effect than to construct tubes having, for instance, an exchange area per unit length that varies from one end of the tube to the other.

The above design features are particularly applicable to the case of heat absorbers in which a heat generating substance is contained in a tube immersed in a fluid the purpose of which is to extract heat from the tube as constantly as possible, per unit length, independently of any temperature increase in the external fluid circulating over the tube of the absorber.

The following description and the appended drawing of a typical system will give a clearer idea on how the invention can be constructed.

Figure 1:
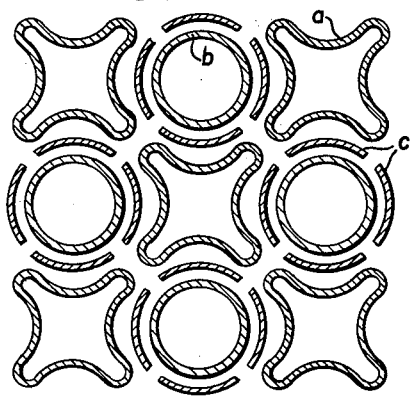
FIG. 1 illustrates the cross-section, drawn perpendicular to the tubes, of part of an exchanger, featuring, across the tubes, the system of deflecting surfaces that is the object of the present invention.
Figure 2:
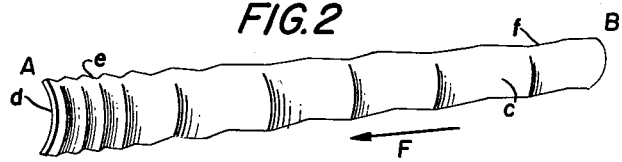
FIG. 2 is an isometric projection representing one form of deflecting surface construction.

In the mode of construction illustrated in FIG. 1, which shows a heat exchanger consisting of tubes that are alternatively of cruciform $a$ and circular $b$ section, a deflecting surface $c$ conforming to the invention, is inserted between, for example, the surface of each cruciform tube and that of the adjacent circular tube. This deflecting surface $c$ consists of a strip of semi-rigid metal sheet stampings of suitable shape of the type used, for instance, in the manufacturing of spring-out steel tape measures that are semi-rigid in the uncoiled state. The profile of the strip features a slight curvature in $d$ as illustrated in FIG. 2.

According to the present invention, this metal strip presents corrugations over its whole length, from end A to end B, such that the pitch is very small in $e$, at the end A of the strip, and gradually increases to a large value in $f$ at the other end B of the strip.

Consequently, with a fluid flowing from B to A in the direction of the arrow F, beat effects which occur initially in B at low frequency and amplitude will increase in frequency and ultimately in amplitude as outlet A is approached. Beating action on the flow of fluid F will be gradual, as explained earlier. Such beats will cause a modification of heat exchange conditions along the tubes. The shape and amplitude of corrugations $e$, $f$ can be selected so as to satisfy a predetermined law of heat exchange along the tube. For instance, if tubes $a$ and $b$ carry heat-generating substances, the rate of heat exchange between the external fluid F and the tube can be made to increase gradually from input B to output A, so that tube heat absorption rate remains constant, despite the fact that the circulating fluid F gathers heat as it progresses along the tubes.

With the system illustrated in FIG. 1, it will be observed that fluid heating occurs within the intervals separating the surface of tube $b$ and the surface of tube $a$, including that of its fins, because tube $a$ can be regarded as a tube featuring four longitudinal hollow fins.

Deflector strips $c$ are secured by suitable means on the tubular plates or are supported by spacer fixtures bearing on the tubes and located at various points along the system. Clearance between the deflecting surfaces and the tube walls may vary along the length of the exchanger. The deflecting surfaces may be fitted only over certain portions of the exchanger system.

Figure 3:
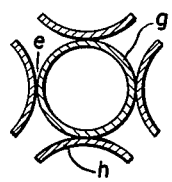
FIG. 3 is a cross-section drawing of a circular section tube featuring four deflecting surfaces in accordance with the invention and welded to the external surface of the tube.

In the alternative form of construction illustrated in FIG. 3 a circular-section tube is fitted along the four generatrices by deflecting strips $h$ similar to those illustrated in FIG. 2. They are secured to the surface of the tube by suitable fixtures.

These deflecting surfaces having the primary function of modifying the flow of external fluid F and not that of affecting heat transmission, the operation simply consists in spot-welding the tops of corrugations $e$, $f$ on tube $g$.

Figure 4:
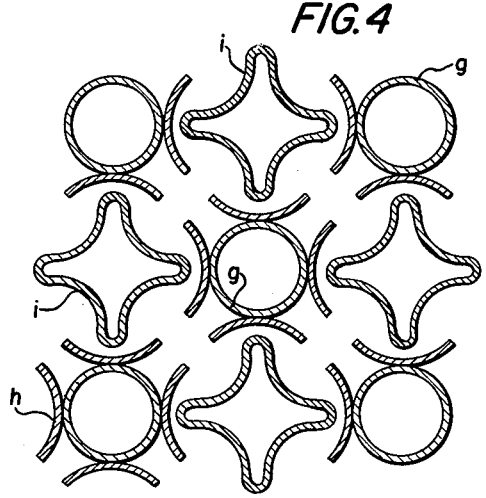
FIG. 4 represents a cross-section of the heat exchanger comprising tubes of cruciform section and tubes of circular section similar to those illustrated in FIG. 3.
Figure 4:
Figure 6:
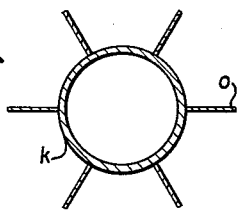
FIGS. 6 to 9 show cross-sections taken respectively through II—II, III—III, IV—IV, V—V in FIG. 5.
Figure 7:
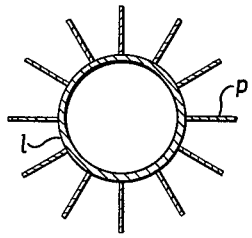

Tubes of circular section, such as $g$, can be utilized to obtain a heat exchanger featuring in alternate sequence cruciform-section tubes $i$ and tubes $g$, as per the arrangement illustrated in FIG. 4. It will be observed that deflecting strips $h$ generate suitable beats in the external fluid F which flows parallel to the axis of the tubes and between the tubes.

The application of such "beaters" $c$ or $h$ can be combined with the utilization of tubes having a variable exchange surface per unit length: Beat action either adds to the action of exchange surface variations or deducts from such action. For example, a tube featuring over an initial portion of given length $a$ large numbers of fins (large area of heat exchange) will not feature any "beaters" opposite that portion, whereas over the next portion, over which it features a lesser number of fins (lesser area of heat exchange) or no fins at all, the tube will face highly efficient "beaters." Alternatively, part of the tube will have a smooth surface and will not be faced with "beaters," whereas, further along, the tube will feature an increasing number of fins and "beaters" of increasing efficiency.

Corrugations $e$, $f$ over the deflecting surface $d$ may have, not only different pitch values, but also varying amplitudes. Preferably, these corrugations will be asymmetrical rather than symmetrical, in that every "wave" will incorporate a fairly sharp up-gradient, followed by a down-gradient of lesser steepness and greater length, slanting in the direction of fluid flow.

Figure 5:
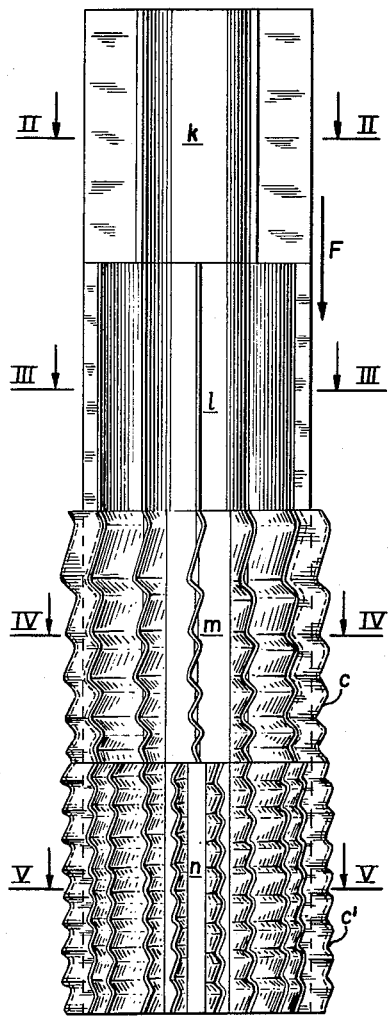
FIG. 5 represents an alternative form of construction for a tube of variable exchange surface.

An exchanger or absorber tube featuring a variable surface of heat exchange is illustrated in FIG. 5, in the form of four tube sections $k$, $l$, $m$, $n$ fitted end to end, each possessing a constant area of heat exchange different from that of the next section, throughout the tube, this tube being immersed in an external fluid flowing in the direction of arrow F.

Figure 8:
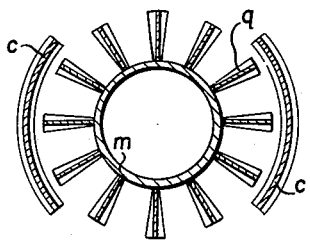
Figure 9:
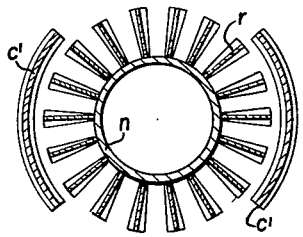

Number-one section $k$ features a number of longitudinal fins $o$. These fins are featured in double that number $p$ by number-two section $l$. In the case of number-three section $m$, fins $q$ are of corrugated shape, as illustrated in FIGURES 5 and 8, so as to generate within fluid F beats that make for increased heat exchange. Finally, number-four section $n$ features larger numbers of corrugated-shape fins $r$.

In addition, starting from number-three section $m$, deflecting surfaces are provided between the tubes of the heat exchanger. These surfaces $c$ feature, as illustrated in FIGS. 5 and 8, corrugations of constant or variable shape, so as to generate beats within fluid F flowing over the tubes, such beats bringing about a modification of heat exchange rate over that section $m$ of the tube. In the case of number-four section $n$, deflecting surfaces $c^1$ feature yet steeper corrugations, as illustrated in FIG. 5.

In this manner, a tube is constructed which possesses, from input to output, heat exchange capabilities that increases with each tube section.

For example, in the case of a heat-generating substance or body over which are placed tube sections $k$, $l$, $m$, $n$, the function of fluid F being to absorb the heat generated by the substance or body, then, by suitable assembly of the different tube sections, a tube can be constructed such that the quantity of heat absorbed by the fluid F is relatively constant throughout the tube, and this in spite of the temperature rise in fluid F as it approaches the outlet of the tube.

Furthermore, if it is observed that, over certain sections, the heat generating substance or body generates more heat than over other sections, it will be possible to modify the sequence of assembly of tube sections $k$, $l$, $m$, $n$ placed over the heat-generating body or substance and to fit those tubes with higher heat absorption capacity over the sections where more heat is generated.

Generally speaking, and as stated in the introduction, it is possible to obtain any predetermined law of heat exchange throughout the exchanger or absorber system, either by varying the number of fins or by providing deflecting strips featuring corrugations of variable amplitude and pitch, or by altering the sequence of tube section distribution.

Obviously, modifications of detail may be added to the mode of construction of the invention. In particular, in the case of tubes traversed by a fluid, deflecting surfaces as per the present invention could be provided inside the tube.

What I claim is:
1. In a tubular heat exchanger, a plurality of tubes longitudinally aligned in parallel relationship adapted to contain a heat-generating body and to have an external fluid flow over the tubes in a direction parallel to the axis of said tubes from an upstream end of said tubes to a downstream end of said tubes in contact with their exterior surfaces to absorb the heat generated within the tubes, and deflector strips having transverse corrugations spaced apart in the longitudinal direction of said tubes, the number of said corrugations per unit length of each deflector strip increasing from said upstream end to said downstream end of said tubes, said deflector strips being disposed longitudinally of said tubes and being spaced radially from the exterior of said tubes, whereby the rate of heat exchange between the tubes and the external fluid is varied during flow of said external fluid selectively in contact with said deflector strips and with said tubes.

2. In a tubular heat exchanger, a plurality of tubes longitudinally aligned in parallel relationship adapted to contain a heat-generating body and to have an external fluid flow over the tubes in a direction parallel to the axis of said tubes from an upstream end of said tubes to a downstream end of said tubes in contact with their exterior surfaces to absorb the heat generated within the tubes, and deflector elements in the form of semi-rigid metal strips having transverse corrugations spaced apart in the longitudinal direction of said tubes, the number of said corrugations per unit length of each deflector strip increasing from said upstream end to said downstream end of said tubes, said deflector strips being disposed longitudinally of said tubes and being spaced radially from the exterior of said tubes, whereby the rate of heat exchange between the tubes and the external fluid is varied during flow of said external fluid selectively in contact with said deflector strips and with said tubes.

3. In a tubular heat exchanger, a plurality of tubes longitudinally aligned in parallel relationship adapted to contain a heat-generating body and to have an external fluid flow over the tubes in a direction parallel to the axis of said tubes from an upstream end of said tubes to a downstream end of said tubes in contact with their exterior surfaces to absorb the heat generated within the tubes, and deflector strips having transverse corrugations spaced apart in the longitudinal direction of said tubes, the number of said corrugations per unit length of each deflector strip increasing from said upstream end to said downstream end of said tubes, said deflector strips being disposed longitudinally of the exterior of said tubes and between adjacent tubes in radially-spaced relationship therewith, whereby the rate of heat exchange between the tubes and the external fluid is varied during flow of said external fluid selectively in contact with said deflector strips and with said tubes.

4. In a tubular heat exchanger, a plurality of tubes longitudinally aligned in parallel relationship adapted to contain a heat-generating body and to have an external fluid flow over the tubes in a direction parallel to the axis of said tubes from an upstream end of said tubes to a downstream end of said tubes in contact with their exterior surfaces to absorb the heat generated within the tubes, and deflector strips having transverse corrugations spaced apart in the longitudinal direction of said tubes, the number of said corrugations per unit length of each deflector strip increasing from said upstream end to said downstream end of said tubes, said deflector strips being disposed longitudinally of said tubes and being spaced radially from the exterior of said tubes and being laterally curved to conform substantially to the curvature of the external surface of said tubes, whereby the rate of heat exchange between the tubes and the external fluid is varied during flow of said external fluid selectively in contact with said deflector strips and with said tubes.

5. In a tubular heat exchanger, a plurality of tubes longitudinally aligned in parallel relationship adapted to contain a heat-generating body and to have an external fluid flow over the tubes in a direction parallel to the axis of said tubes from an upstream end of said tubes to a downstream end of said tubes in contact with their exterior surfaces to absorb the heat generated within the tubes, and deflector strips having transverse corrugations spaced apart in the longitudinal direction of said tubes, the number of said corrugations per unit length of each deflector strip increasing from said upstream end to said downstream end of said tubes, said deflector strips being disposed longitudinally of said tubes and being spaced radially from the exterior of said tubes, each of said tubes being formed from a plurality of axially-aligned interconnected tube sections, and at least some of said tube sections having varying numbers of radially-extending fins increasing in number from the upstream end to the downstream end of each tube, whereby the rate of heat exchange between the tubes and the external fluid is varied during flow of said external fluid in selective contact with said deflector strips and said fins.

6. In a tubular heat exchanger, a plurality of tubes longitudinally aligned in parallel relationship adapted to contain a heat-generating body and to have an external fluid flow over the tubes in a direction parallel to the axis of said tubes, from an upstream end of said tubes to a downstream end of said tubes in contact with their exterior surfaces to absorb the heat generated within the tubes, and deflector strips having transverse corrugations spaced apart in the longitudinal direction of said tubes, the number of said corrugations per unit length of each deflector strip increasing from said upstream end to said downstream end of said tubes, said deflector strips being disposed longitudinally of said tubes and being spaced radially from the exterior of said tubes and being laterally curved to conform substantially to the curvature of the external surface of said tubes, each of said tubes being formed from a plurality of axially-aligned interconnected tube sections, and at least some of said tube sections having varying numbers of radially-extending corrugated fins increasing in number from the upstream end to the downstream end of each tube, whereby the rate of heat exchange between the tubes and the external fluid is varied during flow of said external fluid selectively in contact with said deflector strips and said fins.

References Cited in the file of this patent

UNITED STATES PATENTS

| | | |
|---|---|---|
| 243,496 | Braun | June 28, 1881 |
| 593,338 | Snelgrove et al. | Nov. 9, 1897 |
| 661,944 | Belden | Nov. 20, 1900 |
| 1,350,320 | Lovekin | Aug. 24, 1920 |
| 1,524,520 | Junkers | Jan. 27, 1925 |
| 1,884,777 | Lucke | Oct. 25, 1932 |
| 2,161,887 | Ramsaur | June 13, 1939 |
| 2,717,320 | Shoulders et al. | Sept. 6, 1955 |

FOREIGN PATENTS

| | | |
|---|---|---|
| 22,975 | Great Britain | Nov. 13, 1901 |
| 179,782 | Austria | Oct. 11, 1954 |
| 644,491 | Great Britain | Oct. 11, 1950 |
| 964,415 | France | Jan. 25, 1950 |